(12) United States Patent
Chuang et al.

(10) Patent No.: US 6,921,902 B2
(45) Date of Patent: Jul. 26, 2005

(54) SCATTER CORRECTION DEVICE FOR RADIATIVE TOMOGRAPHIC SCANNER

(75) Inventors: Keh-Shih Chuang, Hsinchu (TW); Jay Wu, Sijhih (TW); Meei-Ling Jan, Longtan Township (TW)

(73) Assignee: National Tsing Hua University, Hsinchu (TW)

( * ) Notice: Subject to any disclaimer, the term of this patent is extended or adjusted under 35 U.S.C. 154(b) by 58 days.

(21) Appl. No.: 10/681,774

(22) Filed: Oct. 7, 2003

(65) Prior Publication Data

US 2005/0072929 A1 Apr. 7, 2005

(51) Int. Cl.[7] ............................................... G01T 1/164
(52) U.S. Cl. ................................................. 250/363.03
(58) Field of Search .......................... 250/363.03, 252.1

(56) References Cited

U.S. PATENT DOCUMENTS 4,679,221 A * 7/1987 O'Brien et al. ............. 378/148
5,780,855 A * 7/1998 Pare et al. ............... 250/363.02
5,903,008 A 5/1999 Li ............................... 250/363
6,590,213 B2 7/2003 Wollenweber ............... 250/363

* cited by examiner

Primary Examiner—David Porta
Assistant Examiner—Marcus Taningco

(57) ABSTRACT

A scatter correction device for radiative tomographic scanners is disclosed. The device comprises at least one steady support component and multiple beam stoppers made of high Z materials such as lead and wolfram. Each beam stopper has two ends fixed on the steady support component respectively. Theses beam stoppers can thus be sustained at fixed locations by the steady support component. During scanning an object, the device is placed between the object and detectors. But when the scatter correction device is applied to a CT scanner, the device is placed between object and radiation source. It attenuates part of the primary radiation with very small affects on the scattered radiation.

12 Claims, 9 Drawing Sheets

SCATTER CORRECTION DEVICE FOR RADIATIVE TOMOGRAPHIC SCANNER

FIELD OF THE INVENTION

The present invention relates generally to an apparatus and method for radiative tomographic scanners, and more specifically to a scatter correction device and method for radiative tomographic scanners. The device and method can be applied to emission type scanners: PET (positron emission tomography) and SPECT (single photon emission tomography) and transmission type scanner: CT (computed tomography).

BACKGROUND OF THE INVENTION

Due to the high resolution and sensitivity, the emission tomographic scanner is becoming the instrument of choice in human functional study. The strength of the tomographic scanner is its ability to qualify the activity distribution of radionuclides in the human body. The accuracy of the quantification depends on an adequate correction of the raw data. In the following, a PET system is used as an example for illustration purpose.

Attenuation and scatter corrections in PET are considered by the nuclear medicine community as a vital component in the production of accurate quantitative data. The attenuation problem can be corrected exactly in PET and limited mainly by the statistics of the acquired data. The correction of the scattered radiation in PET is one of the most challenging tasks.

The PET system utilizes the coincidence detection of a pair of gamma rays generated by the annihilation interaction of a positron and an electron. To increase the sensitivity, the septa device (used to collimate against scatter radiation) is always removed for a 3D PET scan. The scatter events are increased significantly, it is estimated that scatter fraction increases from 14% to 36% when the septa was removed. Scattered events cause the misjudgment of source location and downgrade system's spatial resolution. They add a background to the true distribution and result in reducing the contrast and quantitatively overestimating the actual activity in the reconstructed radioactivity concentrations. Rejection of scattered photons on the basis of energy discrimination has limited performance because the use of relatively wide energy window to maintain accurate counting statistics.

Correction for scatter remains essential not only for quantification but also for lesion detection and image segmentation. The impact of scatter on image generally depends on the energy resolution of the detectors and energy window settings, the object size, shape and chemical composition, and the source distribution. Many of these parameters are non-stationary, which implies a potential difficulty when developing proper scatter correction techniques.

Accurate scatter correction is one of the major problems facing quantitative 3D PET and still is an open question. Much research and development has been concentrated on the scatter compensation required for quantitative 3D PET. The difference among the correction methods is the way in which the scatter component is estimated. They mainly fall into four broad categories: energy window based approaches, curve fitting based approaches, convolution based approaches, and reconstruction based scatter compensation approaches.

Multiple energy window methods have been in use for many years for SPECT. Recent advances in PET acquisition mode and improvement in the detector energy resolution enable the implementation of scatter correction based on energy spectra. This method assumes the high energy (photopeak) window contains both primary and scatter event while the low energy window contains majority of scattered events. There exist a fixed scatter ratio between the total scattered events and low energy window events. From a linear combination of the two data sets, the scattered events conceal. The use of a constant scatter ratio for larger objects might not be adequate. The ratio also varies with the attenuation coefficient of the material. As a result, this method will not adequately handle non-uniform objects. Another disadvantage is that some commercial systems do not allow acquisition of coincidence events in separate windows.

The curve fitting technique is based on the assumption that the scatter spatial distribution can be described by a Gaussian function or second-order polynomials. The scatter at the center is interpolated from the region outside the source object. The assumption could be problematic for scans of large, inhomogeneous regions of the body. Based on similar scheme, this technique compares further the difference between a 3D (high scatter) and 2D (low scatter) scan to estimate the scatter contamination. This method requires an additional 2D scan.

The convolution approaches estimate the distribution of scatter from the standard photopeak data. It uses constant scatter kernels which are parametrized by mono-exponential or Gaussian functions. The scatter distribution is estimated by iteratively convolving the photopeak projections with the kernel. The disadvantages are that it does not consider scatter originating from outside the field of view (FOV) and that the kernels are measured with phantoms that may not adequately represent human anatomy.

The reconstruction based approaches, estimate the scatter component using a rigorous Monte Carlo simulation. The scatter component can be estimated directly from emission and transmission data using Monte Carlo simulation. Ollinger calculates the single-scatter distribution directly using the Klien-Nishina formula and convolutes this scatter distribution to estimate the multiple-scatter. These approaches require large amounts of computational power and processing time due to the repetitive looping over many parameters.

In the disclosure of U.S. Pat. No. 6,590,213, Scott D. Wollenweber improved the speed of execution of model-based scatter algorithms by combining axial data within certain ranges into composite transaxial planes or "super-slices" and thus effectively collapsing data along the axial direction. By so combining the axial data, one can perform the model-based scatter algorithms by looping over the in-plane parameters x and y within each super-slice, instead of looping over both the in-plane parameters and the azimuthal angle dimension. By eliminating the calculations associated with looping over the azimuthal angle dimension, the computation time required for performing the method-based scatter algorithms is reduced.

In the disclosure of U.S. Pat. No. 5,903,008, Jianying Li invented an emission tomographic system for imaging an object of interest. The system, in one form, includes a gantry and a patient table. A detector including a collimator is secured to the gantry, and a computer is coupled to the gantry and to the detector to detect and control the position of the detector relative to the table. The system is configured to determine a transmission measurement and generate a scatter fraction utilizing the transmission measurement. A dual energy window data acquisition algorithm then determines non-scatter photons in a primary energy window utilizing the scatter fraction.

Most scatter correction methods above perform Monte Carlo simulations to calculate the transmission of scattered radiation indirectly. And there are some information, such as body structures and distribution of source activity, that should be known. However, it's impossible to obtain the precise information that the results are not really exactly.

SUMMARY OF THE INVENTION

The present invention has been made to overcome the scatter correction problems for conventional tomographic scanners. The primary object is to provide a scatter correction device and method being applied to all tomographic scanners that use radiation to image objects. An advantage of the device and scatter correction method is the actually measurement of scattered radiation that improves the accuracy of experimental result. This yields better contrast and the mean squared error decreases.

According to the invention, the scatter correction device for tomographic scanners attenuates part of the primary radiation, almost without affection on the scattered radiation. The attenuation fraction of the primary radiation is obtained using a calibration air scan. Scattered radiation at beam stoppers' location is obtained after processing the data from the two scans (with and without the beam stoppers). Recovering the scattered radiation distribution for the whole sinogram is performed by an approximation approach. Subtracting the scattered radiation for the whole sinogram from original data, the primary only sinogram is obtained. After image reconstruction, the scatter corrected image is obtained.

In the preferred embodiments, the scatter correction devices according to the invention are applied to a CT or a SPECT scanner. Using the same method of the invention, the primary projection data can be calculated for each projection angle. After scanning all angles around the object, the sinogram that contains only primary data can be obtained for image reconstruction. The experimental results show that the image using primary components yield better contrast compared with that of conventional methods. The results also show that the mean square error decreases from 0.38× $10^6$ to 0.21×$10^6$ for the reconstructed after scatter correction in accordance with the present invention.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 1:
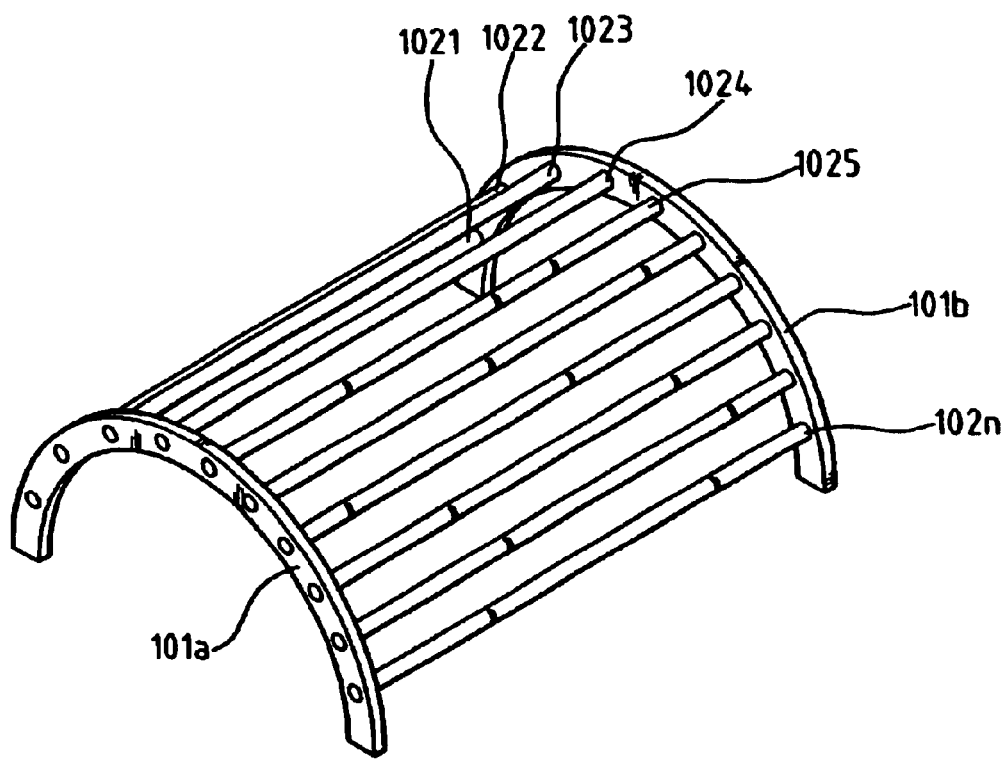
FIG. 1 illustrates a scatter correction device according to the present invention.

FIG. 1 illustrates a scatter correction device according to the present invention. Referring to FIG. 1, the scatter correction device is mainly formed with one or more beam stoppers 1021, 1022, 1023, 1024, 1025, . . . , 102n, and one or more steady support components 101a and 101b. Each beam stopper has a thickness from the range of 2 mm to 5 mm, and the two ends fixed on the steady support components respectively. With such ends, these beam stoppers can be sustained at fixed locations by the steady support components.

The use of the beam stoppers is used to block radiation efficiently. Because high Z materials have great blocking ability, the beam stoppers of the invention can be thin sticks made of high Z materials, as shown in FIG. 1. The high Z materials may include lead and wolfram. According to the experimental results, the beam stoppers with thickness equal to 3 mm can block radiation most efficiently. When the scatter correction device is applied to a SPECT, due to the lower energy photon, the ideal thickness range of the beam stoppers is from 2 mm to 4 mm.

The function of the steady support components is to sustain the thin beam stoppers, and maintain the beam stoppers at fixed locations. However, the steady support components should not interfere the transmission of the the radiation. In this regard, the support components are often made of plastic that radiation passes through without causing any affections.

The scatter correction device can have a vary appearance that depends on the shape and size of the objects to be scanned. If different objects or organs to be scanned have similar shape and size, the same scatter correction device is applied as well. During scanning an object, the scatter correction device is typically placed between the object and detectors. While the scatter correction device is applied to a CT scanner, it is placed between an object and radiation source. To reduce the affect on the scattered radiation, the scatter correction device should position as close to the object as possible in order to cover the whole object. However, application to a PET scanner is an exception, the device does not cover the bottom of the object to be scanned.

Figure 2:
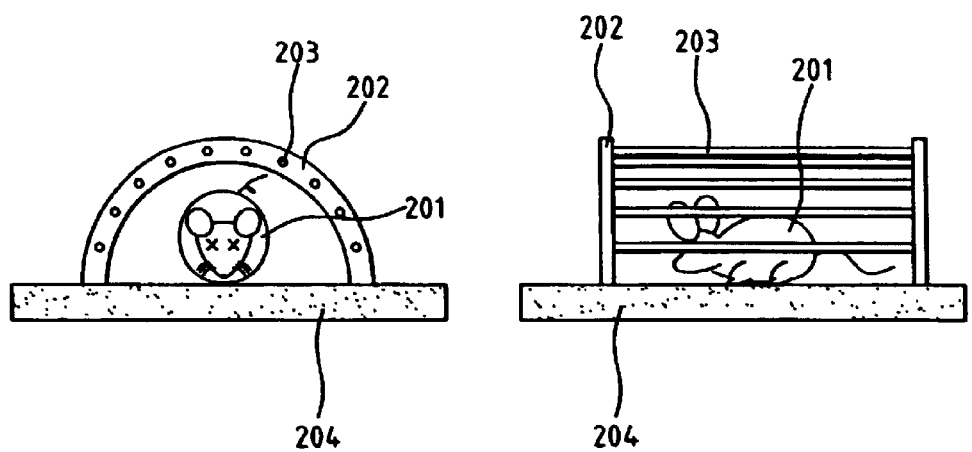
FIG. 2 illustrates a first preferred embodiment of the scatter correction device according to the present invention.

FIG. 2 shows a first preferred embodiment of the scatter correction device according to the present invention. It illustrates the scatter correction device for the animal PET. The scatter correction device positions as close to the object 201 (a mouse) as close as possible, and completely cover the object 201. The scatter correction device comprises a pair of plastic frames 202 with several lead bars 203 inserted. The device can be removed from and placed on top of the couch 204 easily.

Figure 3A:
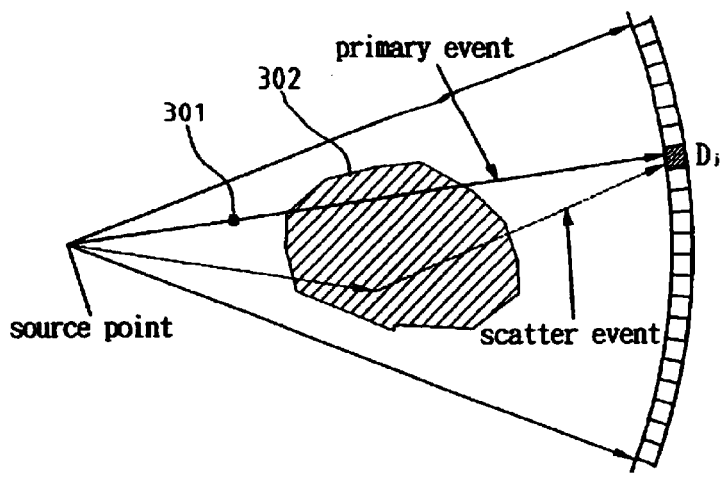
FIG. 3a illustrates the application of a beam stopper according to the invention to a CT scanner.
Figure 3B:
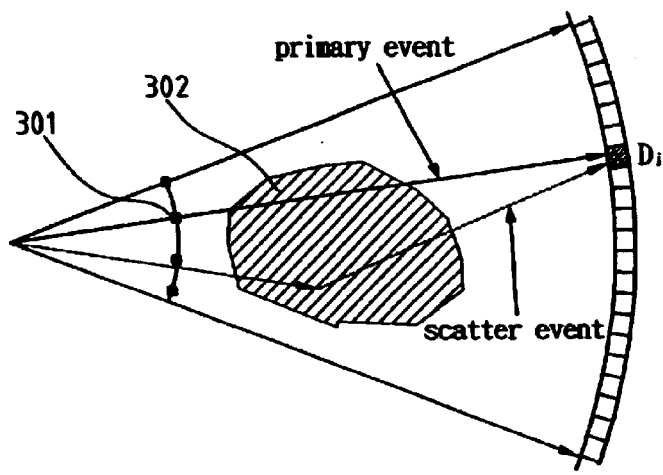
FIG. 3b illustrates the application of multiple beam stoppers according to the invention to a CT scanner.

FIG. 3a illustrates the application of a beam stopper according to the invention to a CT scanner. In FIG. 3a, the beam stopper 301 is placed before the object 302 to block the primary beam from radiation source point. The scatter event is the reading at detector $D_j$. As shown in FIG. 3b, the multiple beam stoppers can be used to have more recordings as well.

Figure 4:
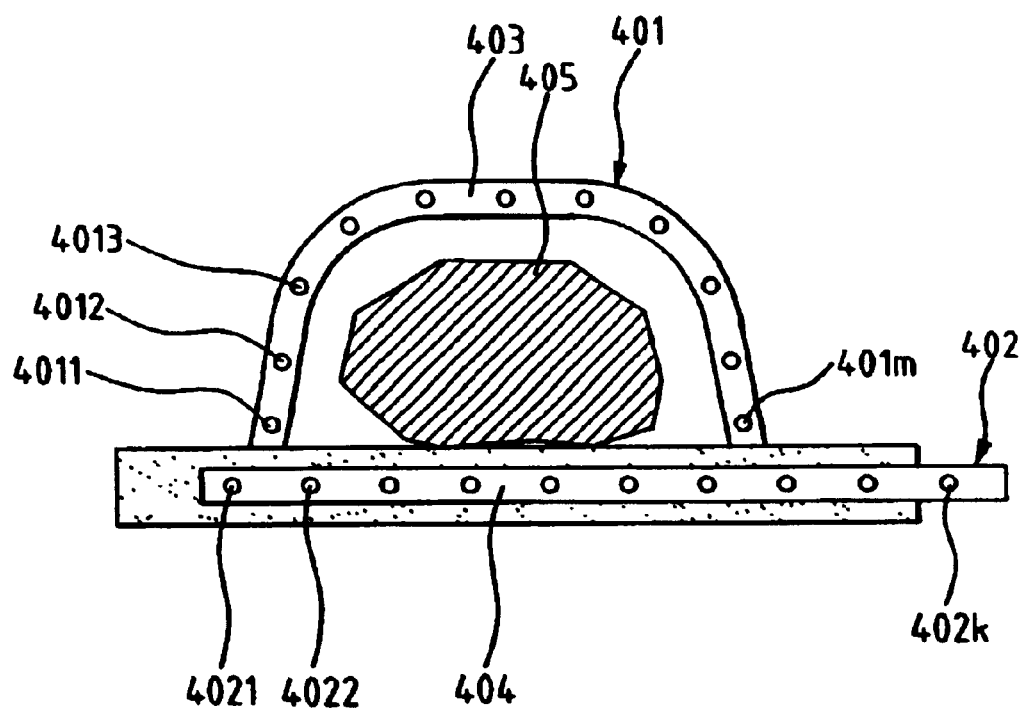
FIG. 4 illustrates the application of multiple beam stoppers according to the invention to a SPECT scanner.

FIG. 4 shows the possible realization of the beam stoppers according to the invention for a SPECT system. It comprises of two parts. The upper part 401 is a half cylindrical birdcage including multiple beams toppers 4011, 4012, ..., 401m, and a supporting steady component 403. The lower part 402 including multiple beam stoppers 4021, 4022, ..., 402k, and a support component 404, is like a sheet. The sheet can be inserted into and remove from the box placed underneath the object 405.

Figure 5:
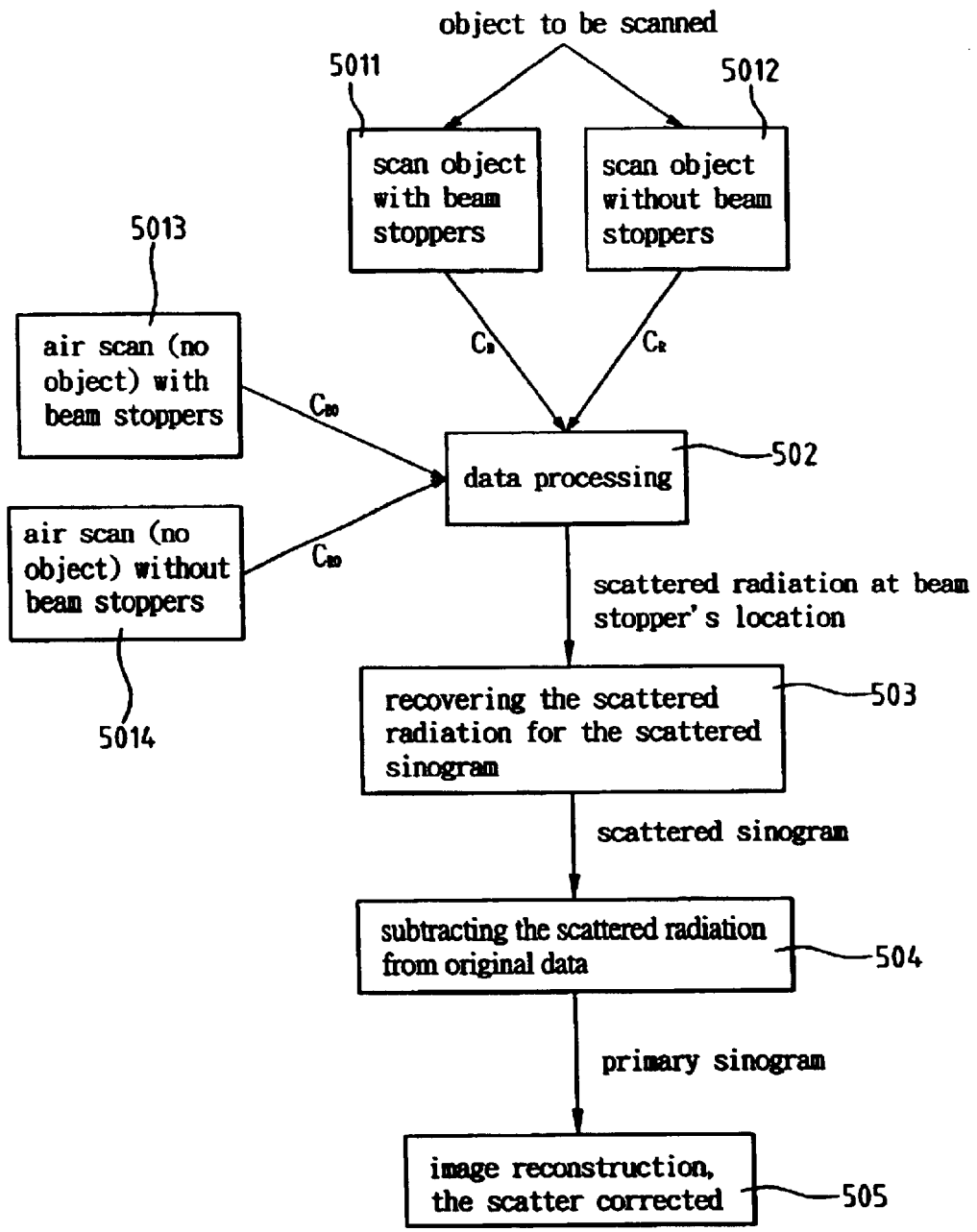
FIG. 5 shows the flow chart of the correcting method implemented in the device shown in FIG. 1.

FIG. 5 shows a flow chart of the scatter correction method implemented in the device shown in FIG. 1. It illustrates the detail steps for correcting the scatter of the invention. The scatter correction method comprises five major steps. The first step is to scan an object with and without the beam stoppers as shown in steps 5011 and 5012 respectively, and using two air scans with and without the beam stoppers as shown in 5013 and 5014 respectively. The second step 502 is to process the data $C_B$, $C_R$, $C_{B0}$ and $C_{R0}$ obtained from steps 5011, 5012, 5013 and 5014, and generates the scattered radiation at beam stopper's location. The third step 503 is to recover the scattered radiation for the scattered sinogram. A sinogram is referred to a file that stores the projection data of a scanner. The fourth step 504 is to yield only primary sinogram by subtracting the scattered radiation from original data. The final step 505 is to reconstruct the image of the source object and correct the scatter radiation.

Figure 6:
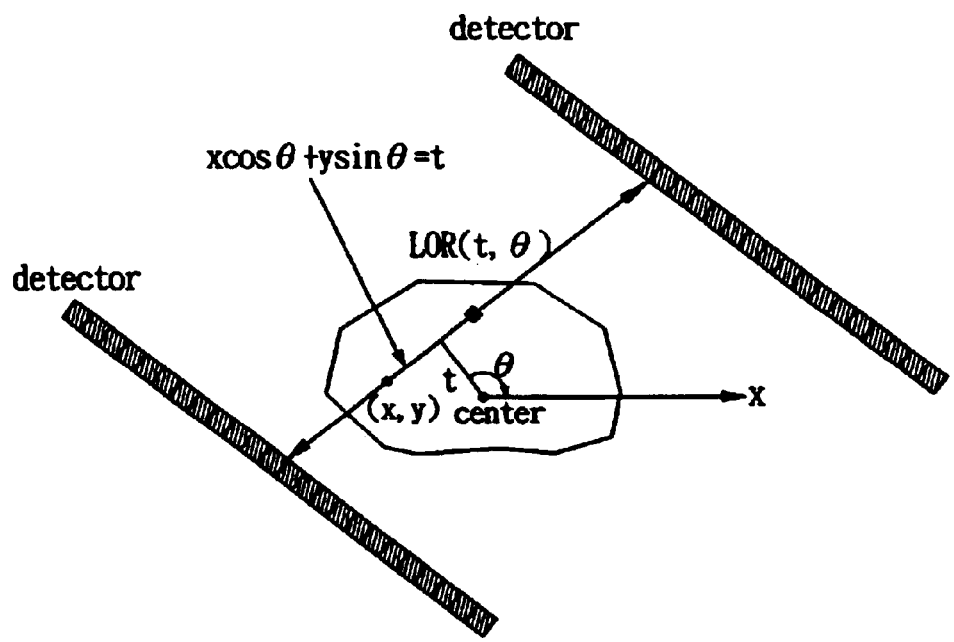
FIG. 6 shows the line of response (LOR).
Figure 7A:
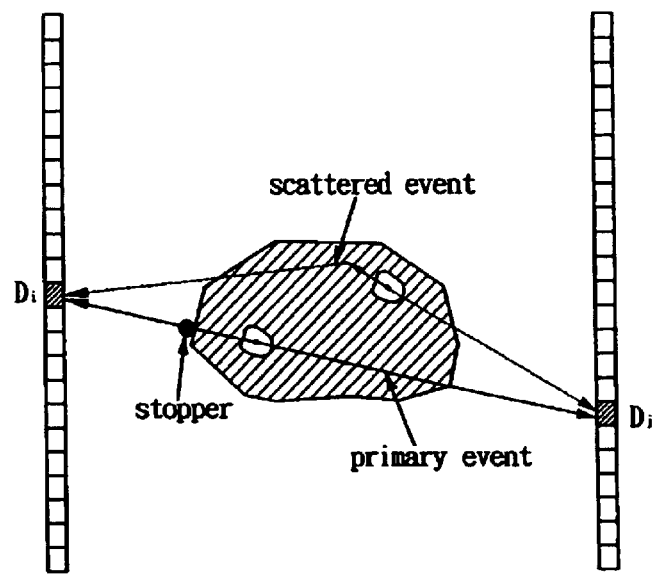
FIG. 7a shows the geometric of the system with one beam stopper.
Figure 7B:
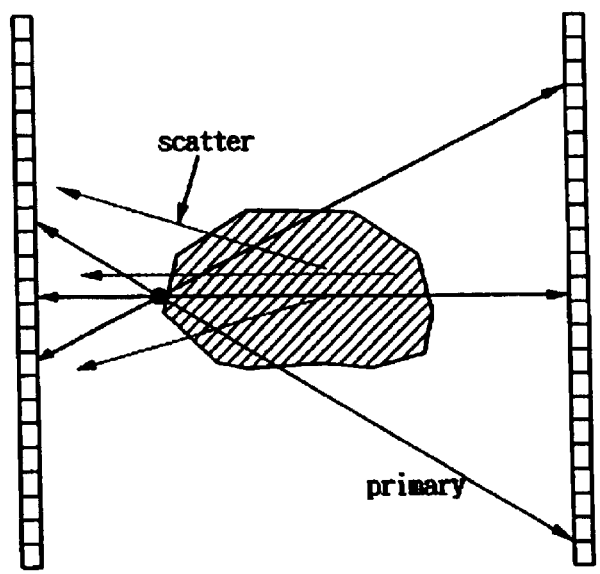
FIG. 7b shows the stopper block several primary radiation.

To describe steps 5011 and 5012 in more detail, FIG. 6 and FIG. 7 respectively illustrate the geometry of a scanner and the line of response (LOR), and the geometric of a system with one beam stopper to block the true (primary) events from being recorded.

Referring to FIG. 6, the line of response represents the line connecting one detector pair. Any point (x,y) on the LOR(t,θ) satisfies the equation x cos θ+y sin θ=t, where t is the distance between LOR and center and θ is called the projection angle. The projection data of a scanner is stored in a sinogram. The element of the sinogram, C(t,θ), comprises the primary radiation emitted from the sources distributed along the LOR(t,θ) and the scattered radiation emitted from all over the body. The purpose of this method is to separate the primary and scattered radiation.

Referring to FIG. 7, a beam stopper is inserted in front of a detector to block the true (primary) events from being recorded. The size of the stopper is small and positioned as close to the body as possible such that the scattered events blocked by it are minimum. Depending on the material and thickness of the stopper, a fraction (T<1.) of the primary photons will be able to transmit through the stopper and recorded by the detector. Note that T=exp(-μL), where μ and L are the linear attenuation coefficient and thickness of the stopper, respectively. The stopper can block several primary radiation, but for each projection angle θ, the stopper block (partially) only the primary radiation emitted from sources that lie on LOR(t, θ) where $$X_i \cos \theta + Y_j \sin \theta = t$$

where $(X_i, Y_j)$ is the location of the stopper.

Referring back to steps 5013 and 5014, two air scans with and without the multiple beam stoppers are performed to calculate the transmission fraction T of the primary photons. The fraction T is depending on the material and thickness of the stoppers. In the air scan, a point source (with no object) is moved inside the FOV (field of view) and stay at each location for the same amount of time. Let $C_{B0}$ and $C_{R0}$ be the count for air scans with and without the beam stoppers.

At step 502, data T, $C_B$ and $C_R$ are calculated to acquire more useful information. Accordingly, the transmission fraction T for LOR(t, θ) is simply the quotient of the two scans, i.e.

$$T(t,\theta) = C_{B0}(t,\theta) / C_{R0}(t,\theta)$$

Note that when T equals to 1, means the LORs are not blocked by the beam stoppers. These air scans need to be performed just one time only. The T information can be stored for subsequent scans using the same device.

Let S and P represent the scatter and primary components of the original signal without stopper and $C_R$ is the counts at LOR(t,θ) in the sinogram without the beam stopper is calculated as $$C_R(t,\theta) = P(t,\theta) + S(t,\theta),$$

and $C_B$, the counts at LOR(t,θ) in the sinogram with the beam stopper, will be the summation of scatter events and a fraction of primary events, i.e.

$$C_B(t,\theta) = T(t,\theta) \times P(t,\theta) + S(t,\theta)$$

After subtracting $C_B$ from $C_R$ and after calculation, yield only primary component at the LORs blocked by beam stoppers, i.e $$P(t, \theta) = \frac{C_R(t, \theta) - C_B(t, \theta)}{1 - T(t, \theta)}$$

And the scattered component at beam stopper's location is obtained by $$S(t,\theta) = C_R(t,\theta) - P(t,\theta)$$

Using multiple stoppers can have multiple readings of the scattered events. At step 503, this invention recovers the scattered radiation distribution for the whole sinogram by an approximation approach. Due to the fact that the distribution of scattered radiation is a spatially slow-varying function, an interpolation scheme is used to recover the whole distribution. If the tomographic scanners are equipped with dual-energy window facilities, the recovery of scattered radiation is more precisely. The advantage of dual-energy window method is actually measurement of radiation, not like in the previous discussion, the assumption might not be exactly true. If the dual-energy window method is combined, the following is the process of operating.

Let $W_H(t,\theta)$ and $W_L(t,\theta)$ represent the counting of high energy window and low energy window, respectively for LOR(t,θ) in the dual-energy window technique, then $$W_H(t,\theta) = P(t,\theta) + f(t,\theta) \times S(t,\theta)$$

$$W_L(t,\theta) = g(t,\theta) \times S(t,\theta)$$

Here f(t,θ)×S(t,θ) represent the fractional scatters fall into the photopeak energy window and are mostly single scattered events and g(t,θ)×S(t,θ) are the multiple scattered events in the low energy window. Define $W_{L/H}(t,\theta)$ as the ratio between $W_L(t,\theta)$ and $W_H(t,\theta)$, then $$W_{L/H}(t, \theta) = \frac{g(t, \theta) \times S(t, \theta)}{P(t, \theta) + f(t, \theta) \times S(t, \theta)}$$

$$W_{L/H}(t, \theta) = \frac{g(t, \theta) \times S(t, \theta)}{P(t, \theta) + S(t, \theta) + f(t, \theta) \times S(t, \theta) - S(t, \theta)}$$

$$= \frac{g(t, \theta) \times S(t, \theta)}{P(t, \theta) + S(t, \theta) + S(t, \theta)(1 - f(t, \theta))}$$

$$= \frac{g(t, \theta) \times SF(t, \theta)}{1 + (1 - f(t, \theta)) \times SF(t, \theta)}$$

where $SF(t,\theta)=S(t,\theta)/(P(t,\theta)+S(t,\theta))$ is the scatter fraction.

Note that in the conventional dual-energy window method, it assumes $f(t,\theta)/g(t,\theta)$ as a constant and the primary events is obtained by subtracting scatter events (=$f(t,\theta) \times W_L(t,\theta)/g(t,\theta)$ from $W_H(t,\theta)$. Using the previously described method, the values of $P(t,\theta)$ and $f(t,\theta) \times S(t,\theta)$ at beam stoppers' location are roughly estimated from $W_H(t,\theta)$. Now let $SF'(t,\theta)=f(t,\theta) \times S(t,\theta)/(P(t,\theta)+f(t,\theta)*S(t,\theta))$. $SF'(t_i,\theta)$ is used as calibration gauge and to interpolate $SF'(t,\theta)$ from $W_{L/H}(t,\theta)$ as a function of t at a specified projection angle θ. The values of $SF'(t_i,\theta)$ at the projected loci of the stoppers can be determined from the previously described method. The ratio between $W_{L/H}(t,\theta)$ and $SF'(t,\theta)$ can be assumed to be a linear function for $t_i<t<t_j$ where $t_i$ and $t_j$ are the projection distance of the two adjacent stoppers. Then $SF'(t,\theta)$ can be interpolated by:

$$SF'(t, \theta) = W_{L/H}(t, \theta) \times \left[ \frac{SF'(t_i, \theta)}{W_{L/H}(t_i, \theta)} + \frac{t - t_i}{t_j - t_i} \left( \frac{SF'(t_j, \theta)}{W_{L/H}(t_j, \theta)} - \frac{SF'(t_i, \theta)}{W_{L/H}(t_i, \theta)} \right) \right]$$

With this scheme, the interpolated values of $SF'(t,\theta)$ at the stoppers are identical to those using the ratio $fS$ and $(P+fS)$. The primary sinogram can be obtained once the $SF'$ sinogram is calculated. The method can be viewed as to perform scatter interpolation qualitatively using dual-energy window information and quantitatively using the measured data. The advantage of this interpolation is that it takes into consideration of the local variation of scattered events. The other benefit is that since the division instead of subtraction is used in calculating the primary event, the reconstructed images will be less noisy.

It is also possible to regress $SF'$ as a second-order polynomial of $W_{L/H}$ from the data measured at the stoppers and estimate $SF'$ for each projection angle using $W_{L/H}$.

After having obtained the scatter sinogram, the primary sinogram is obtained and the image is reconstructed.

Figure 8:
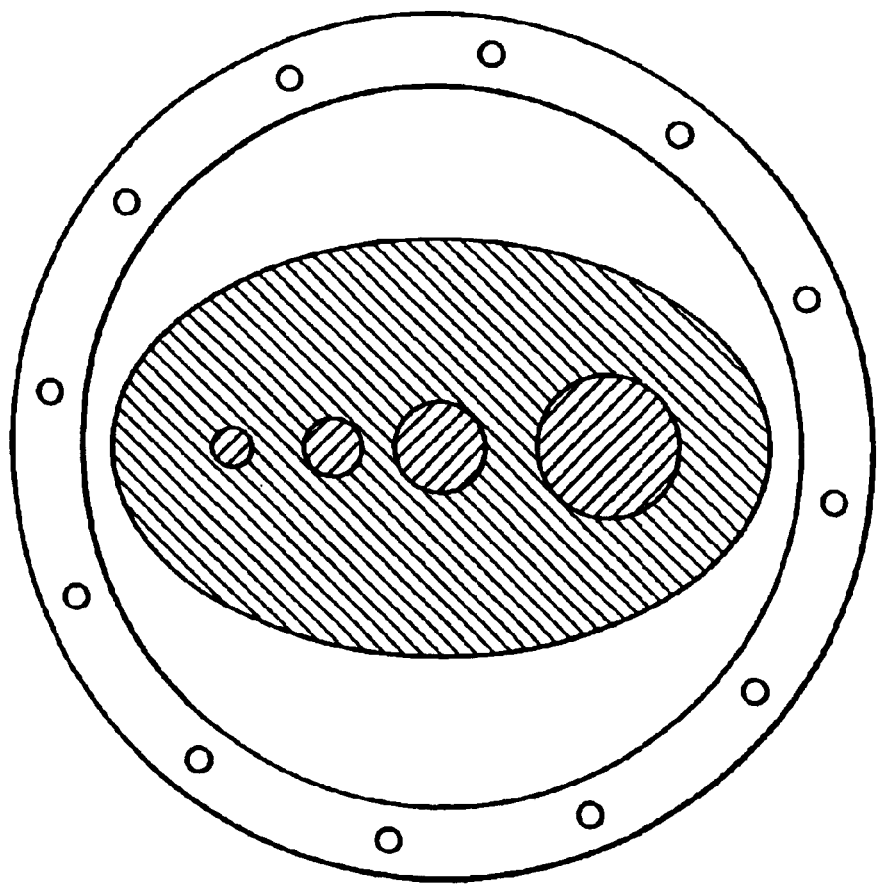
FIG. 8 shows the multiple beam stoppers device consists of 12 circular lead beam stoppers.
Figure 9:
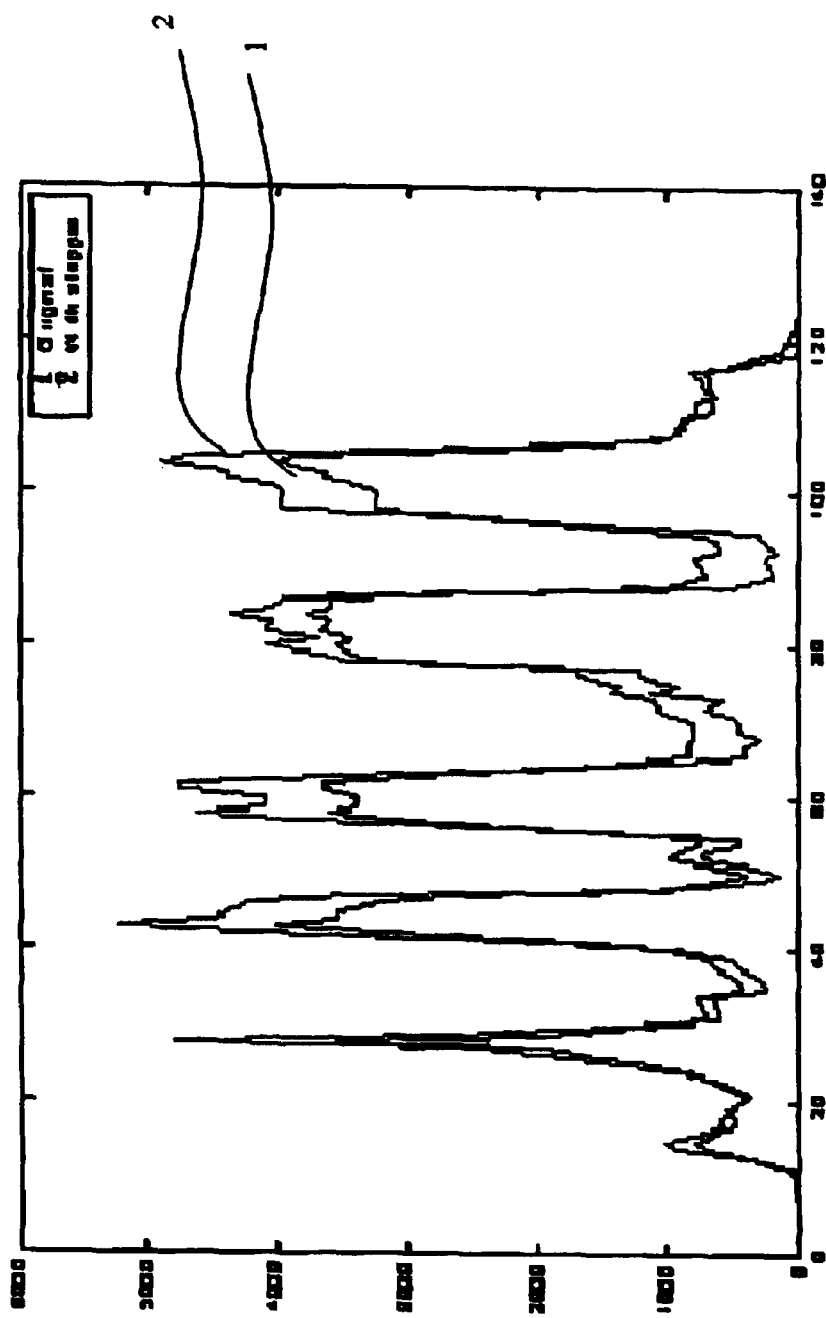
FIG. 9 shows the horizontal profile across the central body for image.

FIG. 8 shows the beam stopper device consists of 12 circular lead (radius=1.5 mm) arranged at equispaced angles around the object. A Monte Carlo software called Simset is employed to simulate the experiment. Using Monte Carlo simulation, the data of primary and scattered radiation will be separated to verify the present method. In this simulation, an elliptical object (long axis=17.03 cm, short axis=12.66 cm) containing 4 circles (radius=0.625, 0.935, 1.25 and 5 cm, respectively) with the same concentration of activity, is shown in FIG. 8. The background activity of the elliptical object is 15% of the circles. The activities of the central region inside the largest circle are 0 to simulate the cold spot. The total counts are $4.6 \times 10^6$ and $1.2 \times 10^5$ for the air scan and object scan, respectively. FIG. 9 shows the horizontal profile across the central body for both images. The image using primary components yield better contrast (0.47 vs 0.82). The results also show that the mean squared error decreases from $0.38 \times 10^6$ to $0.21 \times 10^6$ for the reconstructed image after scatter correction.

What is claimed is:

1. A scatter correction device that applied to tomographic scanners, said scatter correction device comprising at least one beam stopper, and at least one steady support component, each beam stopper having two ends fixed on said support component, during scanning an object, said scatter correction device being placed as close to the object as possible to cover said object.

2. The scatter correction device of claim 1, wherein said device does not cover the bottom of the object when it is applied to a positron emission tomography scanner.

3. The scatter correction device of claim 1, wherein said beam stoppers are made of high Z materials.

4. The scatter correction device of claim 1, wherein said support components are made of the material that radiation passes through without causing any affections.

5. The scatter correction device of claim 1, wherein said scatter correction device has a vary appearance for the objects that are to be scanned and have different shapes and sizes.

6. The scatter correction device of claim 2, wherein said high Z materials includes lead and wolfram.

7. The scatter correction device of claim 2, wherein each beam stoppers is a thin stick having a thickness from the range 2 mm to 5 mm.

8. The scatter correction device of claim 3, wherein said material is plastic.

9. A method of correcting scatter for tomographic scanners with a scatter correction device including at least one beam stopper and at least one steady support component, said method comprising the steps of:

(a) scanning an object with and without beam stopper to generate a first two counts, and using two air scans to generate a second two counts for the air scans;

(b) processing said first and second two counts and computing a scattered radiation at the beam stopper's location;

(c) recovering said scattered radiation for a whole scattered sinogram, wherein a sinogram is referred to a file that stores the projection data of a scanner;

(d) yielding only primary sinogram by subtracting said scattered radiation from original data; and (e) reconstructing the image of a source object and obtaining a scatter corrected image.

10. The method of claim 8, wherein said step (c) is implemented by an approximation approach.

11. The method of claim 8, wherein said step (c) is implemented by an interpolation method.

12. The method of claim 8, wherein said step (c) is implemented by a dual-energy window method.

\* \* \* \* \*